United States Patent
Yang et al.

(10) Patent No.: US 10,939,324 B2
(45) Date of Patent: *Mar. 2, 2021

(54) GATEWAY WEIGHT FACTOR AND LOAD INFORMATION

(71) Applicant: Telefonaktiebolaget LM Ericsson (publ), Stockholm (SE)

(72) Inventors: Yong Yang, Kållered (SE); Anders Fredén, Kullavik (SE); Tony Olsson, Nösund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 259 days.

This patent is subject to a terminal disclaimer.

(21) Appl. No.: 15/958,816

(22) Filed: Apr. 20, 2018

(65) Prior Publication Data

US 2018/0242196 A1    Aug. 23, 2018

Related U.S. Application Data

(63) Continuation of application No. 14/401,220, filed as application No. PCT/EP2014/074272 on Nov. 11, 2014, now Pat. No. 10,015,697.

(Continued)

(51) Int. Cl.
*H04W 28/08* (2009.01)
*H04L 29/12* (2006.01)
(Continued)

(52) U.S. Cl.
CPC ......... *H04W 28/08* (2013.01); *H04L 61/1511* (2013.01); *H04W 48/17* (2013.01);
(Continued)

(58) Field of Classification Search
CPC ..... H04W 28/08; H04W 48/17; H04W 88/16; H04W 84/042; H04W 88/08; H04L 61/1511
See application file for complete search history.

(56) References Cited

U.S. PATENT DOCUMENTS 8,428,610 B2   4/2013  Chowdhury
2010/0124933 A1   5/2010  Chowdhury et al.
(Continued)

FOREIGN PATENT DOCUMENTS

CN     102084705 A    6/2011
RU    2011 145 021 A    5/2013
(Continued)

OTHER PUBLICATIONS

3GPP TR 29.807 V0.3.0. Study on GTP-C overload control mechanisms. Nov. 2013. (Year: 2013).*

(Continued)

*Primary Examiner* — Oussama Roudani
(74) *Attorney, Agent, or Firm* — Rothwell, Figg, Ernst & Manbeck, P.C.

(57) ABSTRACT

A mobility management node (e.g., MME) for selecting a network access gateway node (e.g., PGW) when establishing a PDN connection for a radio terminal to a PDN identified by an APN, which mobility management node is configured to operatively manage the mobility for the radio terminal and which access gateway node is configured to operatively act as a network access gateway to the PDN so as to provide connectivity for the radio terminal to the PDN.

8 Claims, 5 Drawing Sheets

Related U.S. Application Data

(60) Provisional application No. 61/902,429, filed on Nov. 11, 2013.

(51) Int. Cl.
  H04W 48/00 (2009.01)
  H04W 84/04 (2009.01)
  H04W 88/08 (2009.01)
  H04W 88/16 (2009.01)

(52) U.S. Cl.
  CPC .......... *H04W 84/042* (2013.01); *H04W 88/08* (2013.01); *H04W 88/16* (2013.01)

(56) References Cited

U.S. PATENT DOCUMENTS

| | | | |
|---|---|---|---|
| 2010/0281157 A1 | 11/2010 | Ramankutty et al. | |
| 2010/0291943 A1* | 11/2010 | Mihaly | H04L 67/1031 455/450 |
| 2012/0063437 A1 | 3/2012 | Liang et al. | |
| 2014/0003233 A1 | 1/2014 | Rune et al. | |

FOREIGN PATENT DOCUMENTS

| | | |
|---|---|---|
| WO | 2010/102127 A1 | 9/2010 |
| WO | 2012097875 A1 | 7/2012 |

OTHER PUBLICATIONS

3GPP TR 23.843 V1.0.0. Study on Core Network Overload Solutions. Jun. 2013. (Year: 2013).*

3GPP TS 29.303 V12.1.0. Domain Name System Procedures. Sep. 2013. (Year: 2013).*

International Search Report and Written Opinion dated Feb. 11, 2015 in corresponding PCT Application No. PCT/EP2014/074272, 10 pages.

International Preliminary Report on Patentability dated Nov. 5, 2015, in corresponding PCT Application No. PCT/EP2014/074272, 19 pages.

3GPP, "3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 12)," 3GPP TS 29.274 V12.0.0, Technical Specification, Mar. 2013, 228 pages.

3GPP, 3rd Generation Partnership Project; Technical Specification Group Core Network and Terminals; General Packet Radio Service (GPRS); GPRS Tunnelling Protocol (GTP) across the Gn and Gp interface (Release 12), 3GPP TS 29.060 V12.0.0, Technical Specification, Mar. 2013, 176 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0, Technical Specification, Mar. 2013, 290 pages.

3GPP, "3rd Generation Partnership Project; Technical Specification Group Services and System Aspects; General Packet Radio Service (GPRS); Service description; Stage 2 (Release 12)," 3GPP TS 23.060 V12.0.0, Technical Specification, Mar. 2013, 338 pages.

3GPP, "3rd Generation Partnership Project; Technical Specification Group Services and System Aspects; Study on Core Network (CN) overload solutions (Release 12)," 3GPP TR 23.843 V1.1.0, Technical Report, Jul. 2013, 45 pages.

Russian Search Report dated Oct. 31, 2016 issued in Russian Application No. 2016123093 with translation. (4 pages).

Chinese Office Action dated Jul. 3, 2018 issued in Chinese Application No. 201480061574.8. (3 pages).

Chinese Search Report dated Jun. 12, 2018 issued in Chinese Application No. 201480061574.8 (2 pages).

* cited by examiner

GATEWAY WEIGHT FACTOR AND LOAD INFORMATION

CROSS-REFERENCE TO RELATED APPLICATIONS

This application is a continuation of U.S. application Ser. No. 14/401,220, having a section 371(c) date of Nov. 14, 2014 (published as US 20160269935), which is a national stage of international patent application no. PCT/EP2014/074272, having a filing date of Nov. 11, 2014, which claims the benefit of U.S. provisional application No. 61/902,429, filed on Nov. 11, 2013. The above identified applications and publications are incorporated by this reference herein.

TECHNICAL FIELD

Exemplifying embodiments presented herein are directed towards a method for selecting a network access gateway node when establishing a PDN connection for a radio terminal to a PDN identified by an APN, and a mobility management node and an access gateway node each configured to operatively perform embodiments of the method.

BACKGROUND

In a wireless communications network radio terminals communicate with one or more Core Networks (CNs) via one or more Radio Access Network(s) (RAN).

The radio terminals may e.g. be a mobile station (MS) or a user equipment (UE) or similar wireless device, e.g. such as mobile phones, or cellular phones, or laptops or similar devices with wireless capability, and thus can be, for example, portable, pocket, hand-held, computer-comprised, or vehicle-mounted wireless or other wireless devices which communicate voice and/or data with a radio access network.

The Radio Access Network (RAN) covers a geographical area which is divided into cell areas, with each cell area being served by a base station, e.g. a Radio Base Station (RBS). In some radio access networks the base station is e.g. called "NodeB" or "B node" or enhanced NodeB (eNB). A cell is a geographical area where radio coverage is provided by the equipment of a radio base station at a base station site. Each cell is identified by an identity within the local radio area, which may be broadcasted in the cell. The base stations communicate via an air interface with radio terminals within range of the base stations.

In some versions of the RAN, several base stations are typically connected, e.g. by landlines or microwave links, to a Radio Network Controller (RNC) or a Base Station Controller (BSC) or similar. The radio network controller or similar supervises and coordinates various activities of the plural base stations connected thereto. The radio network controllers are typically connected to one or more core networks.

For example, the General Packet Radio Service (GPRS) is a wireless communication system, which evolved from the GSM. The GSM EDGE Radio Access Network (GERAN) is a radio access network for enabling radio terminals to communicate with one or more core networks.

For example, the Universal Mobile Telecommunications System (UMTS) is a third generation wireless communication system, which evolved from the Global System for Mobile Communications (GSM), and is intended to provide improved mobile communication services based on Wideband Code Division Multiple Access (WCDMA) access technology.

Typically the Core Network (CN), to which the radio terminal communicates via the RAN, comprises a number of core network nodes.

One such core network node is the network access gateway node. The network access gateway node provides connectivity for the radio terminals of the communication network to one or more external Packet Data Networks (PDNs). A radio terminal may have simultaneous connectivity with more than one network gateway node for accessing multiple PDNs. The network access gateway node may e.g. be a Gateway GPRS Support Node (GGSN) or a PDN Gateway (PGW). Further properties and functions of a GGSN and a PGW will be discussed later.

Typically the network gateway provides PDN connectivity by creating a PDN-connection for a radio terminal to a PDN served by the network gateway. The PDN connection may be requested by the radio terminal, e.g. by sending a message to the network gateway, e.g. a PDN Connectivity Request message or similar.

An Access Point Name (APN) is used to identify the PDN to which the PDN-connection is to be created for the radio terminal. Thus, a PDN-connection is a connection for a radio terminal to a PDN identified by an APN. The APN may e.g. be provided to the network gateway by the radio terminal, e.g. in a message, sent when requesting the PDN connection, e.g. a PDN Connectivity Request message or similar. Alternatively the APN may e.g. be known by the network gateway (e.g. predefined in the network gateway) such that the network gateway knows that this APN is to be used for the particular radio terminal.

Thus, the APN identifies the PDN that a radio terminal wants to communicate with. In addition to identifying a PDN, an APN may also be used to define the type of service—e.g. connection to wireless application protocol (WAP) server, multimedia messaging service (MMS)—that is provided by the PDN. APN is e.g. used in 3GPP data access networks, e.g. the above mentioned GPRS and/or in the Evolved Packet Core (EPC).

The APN structure may e.g. comprise a network identifier and an operator identifier. The network identifier may e.g. define the external network to which the network gateway is connected. Optionally, it may also include the service requested by the radio terminal. The operator Identifier may define the specific operator's packet domain network in which the network gateway is located. This part of the APN may be optional. The operator Identifier may e.g. comprise the Mobile Country Code (MCC) and the Mobile Network Code (MNC) which together may uniquely identify a mobile network operator.

The use of PDNs, PDN connections and APNs is well known to those skilled in the art, especially within the framework of the 3GPP specifications, and it needs no further detailed explanations.

Now, when a PDN connection is to be established for a radio terminal to a specific PDN identified by an APN, then a network access gateway has to be selected to provide connectivity for the radio terminal to the PDN in question. This selection may be done by a mobility management node in the core network of the communication network, e.g. such as a Mobility Management Entity (MME) or similar. Properties and functions of a MME will be further discussed later.

Typically, the mobility management node selects a suitable network access gateway node among a number available access gateway nodes serving the APN in question based on the total load that each available access gateway node experience and a weight factor indicating the relative amount at which each access gateway node should be selected when PDN connections are created. Each access gateway may advertise the total load that it experience to the mobility management node. The load at node level is distinct from the load at APN level. The mobility management node may receive said weight factors from a Domain Name Server (DNS) or similar.

FIG. 2 is a schematic illustration of a MME performing a known selection scheme as the one now discussed, however selecting a Serving Gateway (SGW) instead of a PGW though the principle is the same. As can be seen in FIG. 2, the MME receives the load information from each available SGW (SGW1 20%, SGW2 60%, SGW3 80%). The MME receives the weight factor indicating the relative amount at which each access gateway node should be selected when PDN connections are created (SGW1 25, SGW2 25, SGW3 50). The MME then calculates the effective load for each SGW such that the load information is subtracted from 100% and the result is multiplied by the weight factor for the SGW in question. The MME then selects the SGWs based on the effective load for each SGW divided by the sum of all effective loads.

However, to improve the selection of a suitable network access gateway it has been suggested that each network access gateway that may be selected by the mobility management node should advertise the load per APN experienced by the access gateway in question. For example, the access gateway may advertise to the mobility management node that its capacity for handling PDN connections to an APN is at a certain level, e.g. that it handles PDN connections to the APN at a certain percentage of its capacity of handling PDN connections for that APN.

Some reasons for allowing the network access gateway (e.g. a PGW) that may be selected by the mobility management node to advertise the load condition at the APN level granularity may perhaps be described as follows:

To achieve evenly balanced network with the APN level granularity: The PGW may be configured to handle more than one APN in the network. In such a case, the PGW may be additionally configured to allocate different resources (e.g. based on the session license) for each of the configured APN, e.g. the PGW may be configured to handle "X" number of sessions for the "consumer" APN while "Y" number of session for the "corporate" APN. In this case, the load information with node level granularity is not sufficient to make better decision of the APN level load condition of the target PGW. And hence, it could result in a network where one PGW has more sessions for the "consumer" APN while another PGW has more sessions for the "corporate" APN. Thus, an evenly balanced network with APN level load granularity cannot be realized.

To ensure effective overload control in the network: If the distribution of sessions at APN level is uneven, then there is a high risk of overload of some PGWs as compared to other PGWs, e.g. the PGW handling sessions for "consumer" APN may have to handle more messages (e.g. generated due to mobility events resulting into change of ULI, RAT type, Serving GW, etc.) as compared to the PGW handling sessions for "stationary-machine" APN. This would result in some PGWs facing overload condition more often while the resources (e.g. handling of messages) of other PGWs remain underutilized. Thus, the situation leads to poor overload control of the network.

To ensure efficient node selection algorithm: Based on the node level load information, the source node (e.g. MME) may end-up selecting the PGW for a new session for the given APN. However, the selected PGW may reject the new session request if it is running at 100% load capacity. Or the new session request may be throttled by the source node based on the overload information of the APN for the given PGW. Thus, unless the source node takes the overload information into account while performing the node selection, the new session request may be denied (i.e. rejected by the selected PGW or throttled by the source node based on PGW's APN level overload information) while the other PGW may have the capacity to handle the same. Thus, the lack of APN level load information may result in inefficient node selection algorithm at the source node.

However, if load control information is provided at APN level, there will be some technical problems since the weight factor is defined at node level in the DNS:

How should the load control information at APN level be used? Should it be used separated from load control information at node level, or should it be used together with load control information at node level?

If load control information at APN level should be used separately, should it then be used together with the weight factors in the DNS or not?

If we use load control information at APN level together with the weight factors, then it will only work when the APN capacity of each PGW is in the same proportion of the total node capacity. For example, assume that PGW1 has a weight factor of 10 and that it supports two APNs, APN 1 with 1,000,000 PDN connections and APN2 with 2,000,000 PDN connections; while PGW2 has weight factor of 5, and if it also support APN1 and APN2, its APN1 capacity must be 500,000 PDN connections and APN2 capacity must be 1,000,000 PDN connections. With this precondition, the load sharing between PGW 1 and PGW 2 for every APN would work. But in reality, this is often not the case, in fact different PGWs may support a different set of APNs and may have different APN capacities.

If we use load control information at APN level without considering the weight factors, what will happen then? For example, assume that there are two PGWs, PGW1 has capacity with supporting 800,000 PDN connections for APN 1 and PGW 2 has capacity with supporting 200,000PDN connections. The MME/SGSN should select PGW1 with 800,000/(800,000+200,000) and PGW 2 with 200,000/(800,000+200,000). This will achieve a type of load sharing among PGW 1 and PGW 2 for APN1. Now if we use load control information at APN level and we assume that PGW1 provides load control information for APN 1 with 50%, while PGW 2 provides load control information for APN 1 with 50%: then of 10 PDN connection creation requests, 5 would go to PGW 1 and 5 would go to PGW 2. This will eventually lead to an unbalanced load, considering the different capacity of PGW 1 and PGW 2 with respect to APN 1, which is against our initial purpose. After some time, PGW 1 may be loaded at 60%, while PGW2 will be loaded at 90%, but the selection proportions will be 60%/(60%+90%) and 90%/(60%+90%). This will not help at all to achieve load sharing, even at 99% load in PGW 2, in the end PGW 2 will be overloaded on APN1, (100% load) this is NOT what we want.

It seems that a direct use of load Control information at APN level will never achieve load sharing, since nodes with less capacity will quickly reach its limits and become overloaded.

SUMMARY

In view of the above there seems to be a need for an improved method for selecting a network access gateway node when establishing a PDN connection for a radio terminal to a PDN identified by an APN.

Some of the drawback indicated above are mitigated or eliminated by an embodiment of the present solution directed to a method in a mobility management node (MME) for selecting a network access gateway node when establishing a Packet Data Network (PDN) connection for a radio terminal (UE) to a PDN identified by an Access Point Name (APN), which mobility management node is configured to operatively manage the mobility for the radio terminal and which access gateway node is configured to operatively act as a network access gateway to the PDN so as to provide connectivity for the radio terminal to the PDN, the method comprising: receiving, from a number of network access gateway nodes APN capacity allocation information indicating the APN capacity that each access gateway node has allocated to serve the APN, and APN load information indicating the APN load that each access gateway currently experience with respect to the APN; receiving, from a Domain Name Server (DNS) weight factor information indicating the relative amount at which each access gateway node should be selected when a PDN connection is created; and selecting a network access gateway node among said number of network access gateways based on the APN capacity allocation information and the APN load information and the weight factor information.

The selecting may comprise: calculating an effective load for each network access gateway node with respect to said APN based on the APN load, the APN capacity and the weight factor information for each network access gateway node, and then selecting the network access gateway node among said number of network access gateways based on the effective load for each network access gateway divided by the sum of the effective loads for all available network access gateways.

The selecting may comprise: calculating an effective load for each network access gateway node with respect to said APN such that the APN load is subtracted from 100% for each network access gateway and the result is multiplied by the APN capacity for the APN and the weight factor information for the network access gateway node, and then selecting the network access gateway node among said number of network access gateways based on the effective load for each network access gateway divided by the sum of the effective loads for all available network access gateways.

Introduction of APN capacity allocation information makes it possible to accomplish a load sharing among the available network access gateway nodes that considers the actual APN capacity allocated by each available network access gateway node. Moreover, using the APN capacity allocation information together with the DNS weight factor information offers compatibility with previous solutions using the DNS weight factor in this connection and also a further possibility of setting the parameters for selecting a suitable network access gateway node.

Some of the drawback indicated above are also mitigated or eliminated by an embodiment of the present solution directed to a mobility management node configured to operatively select a network access gateway node when establishing a Packet Data Network (PDN) connection for a radio terminal (UE) to a PDN identified by an Access Point Name (APN), which mobility management node is configured to operatively manage the mobility for the radio terminal and which access gateway node is configured to operatively act as a network access gateway to the PDN so as to provide connectivity for the radio terminal to the PDN, wherein the mobility management node comprises a processor arrangement configured to operatively: receive, from a number of network access gateway nodes, APN capacity allocation information indicating the APN capacity that each access gateway node has allocated to serve the APN, and APN load information indicating the APN load that each access gateway currently experience with respect to the APN; receive, from a Domain Name Server (DNS) weight factor information indicating the relative amount at which each access gateway node should be selected when a PDN connection is created; and select a network access gateway node among said number of network access gateways based on the APN capacity allocation information and the APN load information and the weight factor information.

The mobility management node may be configured to: calculate an effective load for each network access gateway node with respect to said APN based on the APN load, the APN capacity and the weight factor information for each network access gateway node, and then select the network access gateway node among said number of network access gateways based on the effective load for each network access gateway divided by the sum of the effective loads for all available network access gateways.

The mobility management node may be configured to: calculate an effective load for each network access gateway node with respect to said APN such that the APN load is subtracted from 100% for each network access gateway and the result is multiplied by the APN capacity for the APN and the weight factor information for the network access gateway node; and then select the network access gateway node among said number of network access gateways based on the effective load for each network access gateway divided by the sum of the effective loads for all available network access gateways.

Some of the drawback indicated above are mitigated or eliminated by an embodiment of the present solution directed to a method in a network access gateway node for enabling a mobility management node to select a network access gateway node among a number of network access gateway nodes when establishing a Packet Data Network (PDN) connection for a radio terminal to a PDN identified by an Access Point Name (APN), which mobility management node is configured to operatively manage mobility for the radio terminal and which network access gateway node is configured to operatively act as a network access gateway to the PDN so as to provide connectivity for the radio terminal to the PDN, the method comprising: allocating an APN capacity to serve the APN; detecting the APN load that is currently experienced with respect to the APN; and reporting, to the mobility management node, APN capacity allocation information indicating the APN capacity that is allocated to serve the APN, and APN load information indicating the APN load that is currently experienced with respect to the APN.

Some of the drawback indicated above are also mitigated or eliminated by an embodiment of the present solution directed to a network access gateway node configured to operatively enable a mobility management node to select a network access gateway node among a number of network access gateway nodes when establishing a Packet Data Network (PDN) connection for a radio terminal to a PDN identified by an Access Point Name (APN), which mobility management node is configured to operatively manage mobility for the radio terminal and which network access gateway node is configured to operatively act as a network access gateway to the PDN so as to provide connectivity for the radio terminal to the PDN, wherein the network access gateway node comprises a processor arrangement configured to operatively: allocate an APN capacity to serve the APN; detect the APN load that is currently experienced with respect to the APN; and report, to the mobility management node, APN capacity allocation information indicating the APN capacity that is allocated to serve the APN, and APN load information indicating the APN load that is currently experienced with respect to the APN.

It is noted that the solution described herein, with reference to exemplifying embodiments, relates to all possible combinations of features recited in the claims. Further features of, and advantages with, the present solution will become apparent when studying the appended claims and the following description. Those skilled in the art realize that different features of the present solution can be combined to create embodiments other than those described in the following.

BRIEF DESCRIPTION OF THE DRAWINGS

The foregoing will be apparent from the following more particular description of the exemplifying embodiments, as illustrated in the accompanying drawings in which like reference characters refer to the same parts throughout the different views.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
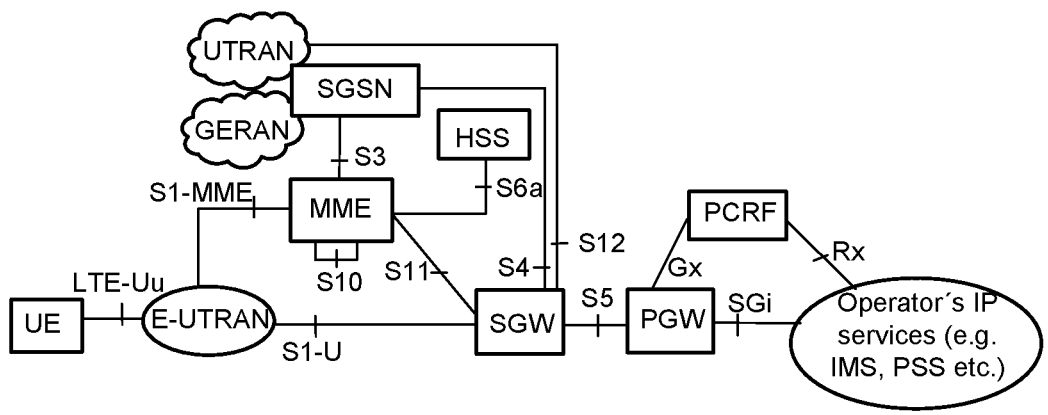
FIG. 1 is a schematic illustration of a well known exemplifying LTE architecture for 3GPP accesses within an Evolved Packet System (EPS).

FIG. 1 shows a schematic overview of a well-known exemplifying wireless communication system. The system is a so called LTE based system. It should be pointed out that the terms "LTE" and "LTE based" system is here used to comprise both present and future LTE based systems, such as, for example, advanced LTE systems.

The exemplifying wireless communication system is an LTE based system. It should be pointed out that the terms "LTE" and "LTE based" system is here used to comprise both present and future LTE based systems, such as, for example, advanced LTE systems. It should be appreciated that although FIG. 1 shows a wireless communication system in the form of an LTE based system, the example embodiments herein may also be utilized in connection with other wireless communication systems, such as e.g. GSM or UMTS, comprising nodes and functions that correspond to the nodes and functions of the system in FIG. 1.

The exemplifying wireless communication system in FIG. 1 comprises a base station in the form of an eNodeB (shown as E-UTRAN in FIG. 1), operatively connected to a Serving Gateway (SGW), in turn operatively connected to a Mobility Management Entity (MME) and a Packet Data Network Gateway (PGW), which in turn is operatively connected to a Policy and Charging Rules Function (PCRF). The eNodeB is a radio access node that interfaces with a mobile radio terminal, e.g. a UE. The eNodeBs of the system forms a Radio Access Network (RAN) in the form of an Evolved Universal Terrestrial Access Network (E-UTRAN) for LTE communicating with the UEs over an air interface such as LTE-Uu.

The Serving Gateway (SGW) routes and forwards user data packets over 51-U, whilst also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the DL data path and triggers paging when DL data arrives for the UE, and further manages and stores UE contexts, e.g. parameters of the IP bearer service, network internal routing information. It also performs replication of the user traffic in case of lawful interception. The SGW communicates with the MME via interface S11 and with the PGW via S5. Further, the SGW may communicate with the UMTS radio access network UTRAN and with the GSM EDGE Radio Access Network (GERAN) via S12.

The Mobility Management Entity (MME) is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user by interacting with the Home Subscriber Server (HSS). The Non-Access Stratum (NAS) signaling terminates at the MME and it is also responsible for generation and allocation of temporary identities to UEs via S1-MME. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the Serving GPRS Support Node (SGSN). The MME also terminates the S6a interface towards the home HSS for roaming UEs. Further, there is an interface S10 configured for communication between MMEs for MME relocation and MME-to-MME information transfer.

The Packet Data Network Gateway (PGW) provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as e.g. WiMAX and 3GPP2 (CDMA 1x and EvDO). The interface between the PGW and the packet data network is referred to as the SGi. The packet data network may be an operator external public or private packet data network or an intra operator packet data network, e.g. for provision IP Multimedia Subsystem (IMS) services.

The Policy and Charging Rules Function (PCRF) determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

It should be added that the exemplifying wireless communication system in FIG. 1 comprises a Core Network (CN), to which the UEs communicates via the E-UTRAN. A CN comprises a number of core network nodes, e.g. such as the MME, SGW, PGW and the PCRF. The PGW and preferably other gateway nodes mentioned herein are configured to operatively act as a gateway for the core network to one or more external Packet Data Networks (PDNs). Also, the core network is preferably configured to provide connectivity to these PDNs for radio terminals (e.g. UEs) served by the core network.

As mentioned above, the network gateway node provides connectivity for the radio terminals (e.g. UEs) of the communication network to one or more external Packet Data Networks (PDNs). A radio terminal may have simultaneous connectivity with more than one network gateway node for accessing multiple PDNs. The network gateway node may e.g. be a Gateway GPRS Support Node (GGSN) or a PDN Gateway (PGW).

Typically the network gateway provides PDN connectivity by creating a PDN-connection for a radio terminal to a PDN served by the network gateway. The PDN connection may be requested by the radio terminal, e.g. by sending a message to the network gateway, e.g. a PDN Connectivity Request message or similar.

An Access Point Name (APN) is used to identify the PDN to which the PDN-connection is to be created for the radio terminal. Thus, a PDN-connection is a connection for a radio terminal to a PDN identified by an APN. The APN may e.g. be provided to the network gateway by the radio terminal, e.g. in a message, sent when requesting the PDN connection, e.g. a PDN Connectivity Request message or similar. Alternatively the APN may e.g. be known by the network gateway (e.g. predefined in the network gateway) such that the network gateway knows that this APN is to be used for the particular radio terminal.

Thus, the APN identifies the PDN that a radio terminal wants to communicate with. In addition to identifying a PDN, an APN may also be used to define the type of service—e.g. connection to wireless application protocol (WAP) server, multimedia messaging service (MMS)—that is provided by the PDN. APN is e.g. used in 3GPP data access networks, e.g. the above mentioned GPRS and/or in the Evolved Packet Core (EPC).

The APN structure may e.g. comprise a network identifier and an operator identifier. The network identifier may e.g. define the external network to which the network gateway is connected. Optionally, it may also include the service requested by the radio terminal. The operator Identifier may define the specific operator's packet domain network in which the network gateway is located. This part of the APN may be optional. The operator Identifier may e.g. comprise the Mobile Country Code (MCC) and the Mobile Network Code (MNC) which together may uniquely identify a mobile network operator.

The use of PDNs, PDN connections and APNs is well known to those skilled in the art, especially within the framework of the 3GPP specifications, and it needs no further detailed explanations.

Below, an exemplifying embodiment will be described for selecting a network access gateway node when establishing a PDN connection for a radio terminal to a PDN identified by an APN. The embodiment is described with reference to FIG. 3, wherein the mobility management node is exemplified by an MME and the network access gateways are exemplified by PGWs.

To achieve an improved load sharing among available PGW per APN, each available PGW provides APN capacity allocation information to the MME indicating the capacity that the specific PGW has allocated to serve the APN in question, preferably in relative to the node level weight factor defined in the DNS. The APN capacity factor is preferably denoted as a percentage figure. For example, assume that a PGW has capacity to support 1,000,000 PDN connections and that the PGW is configured to support 100.000 PDN connections for APN1, then APN1's capacity factor would be 10% (100,000/1,000,000) for that PGW. The PGW's node level capacity supporting 1,000,000 PDN connections is preferably reflected in the weight factor in the DNS. When the MME/SGSN receives the APN capacity allocation information and the APN load information from the PGW then the MME/SGSN uses this information together with the DNS weight factor to select a PGW among the available PGWs.

Figure 3:
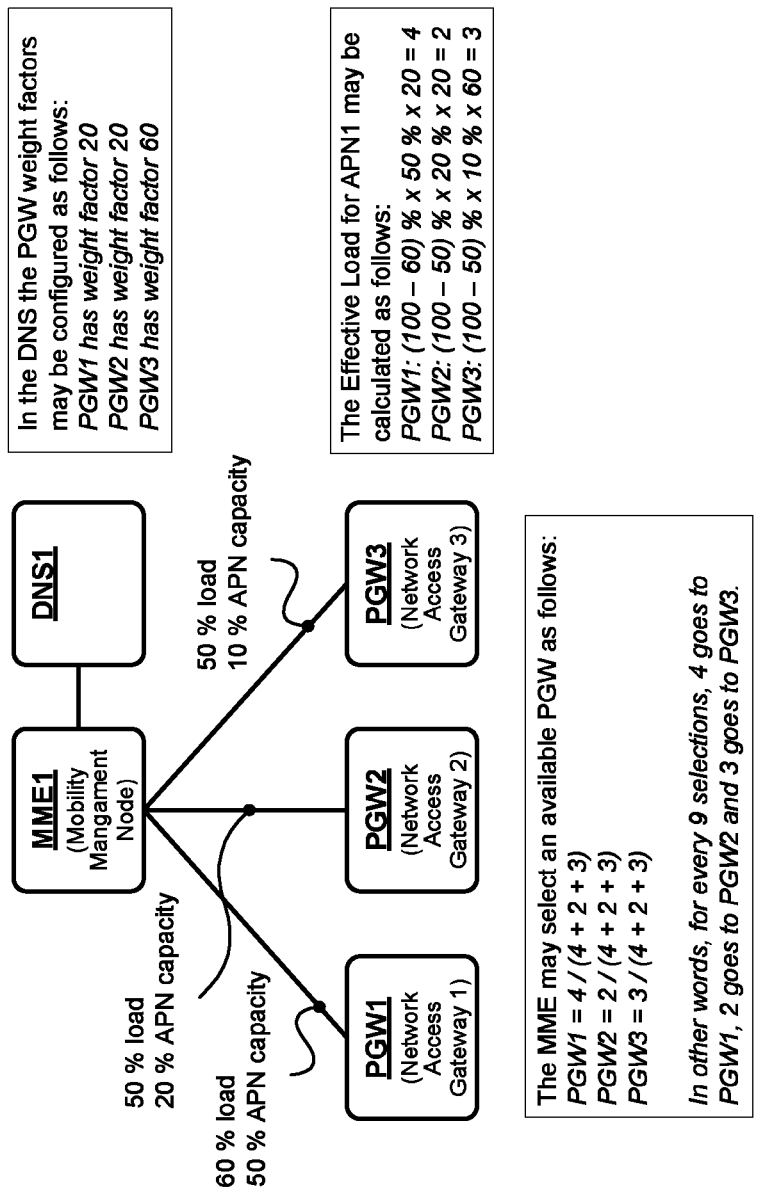
FIG. 3 is a schematic illustration of an exemplifying selection scheme for selecting a PGW when establishing a PDN connection for a UE to a PDN identified by an APN.

FIG. 3 is a schematic illustration of an exemplifying embodiment of a selection scheme for selecting a network access gateway node when establishing a Packet Data Network (PDN) connection for a radio terminal (e.g. a UE) to a Packet Data Network (PDN) identified by an APN. It is preferred that the selection scheme is performed in a mobility management node, denoted MME1 in FIG. 3. The mobility management node may e.g. be an MME or a Serving GPRS Support Node (SGSN) or similar. The network access gateway node to be selected is exemplified by three (3) Packet Data Network Gateways (PGWs), denoted PGW1, PGW2 and PGW3 respectively in FIG. 3. Alternatively, one or more of the network access gateway nodes may e.g. be a Gateway GPRS Support Node (GGSN) or similar. The radio terminal for which a PDN connection is to be established is not shown in FIG. 3. However, the radio terminal can e.g. be an UE or similar as shown in FIG. 1. Similarly, the PDN in question is not shown in FIG. 3, but it can e.g. be an Operator's IP services denoted 400 in FIG. 1, e.g. corresponding to or representing the Internet or similar. Indeed, it is generally preferred that the exemplifying MME1 in FIG. 3 corresponds to the MME in FIG. 1, with the addition that MME1 is configured according to embodiments of the present solution. Similarly, it is generally preferred that each of the exemplifying PGW1, PGW2 and PGW3 in FIG. 3 corresponds to the PGW in FIG. 1, with the addition that each PGW1, PGW2 and PGW3 is configured according to embodiments of the present solution. The correspondence between the nodes shown in FIG. 1 and the nodes shown in FIG. 3 are easily understood by a skilled person having the benefit of this disclosure and the correspondence needs no detailed description as such.

As can be seen in FIG. 3, the MME1 receives APN capacity allocation information and APN load information from each available PGW, i.e. PGW1, PGW2, PGW3 respectively. This may e.g. occur before or in connection with selecting a PGW for establishing a PDN connection for a radio terminal (e.g. a UE) to a PDN identified by an APN (e.g. APN1).

The APN capacity allocation information indicates the capacity that each PGW has allocated of its full APN serving capacity to serve a particular APN, e.g. APN1. For example, assume that PGW1, PGW2 and PGW3 have allocated 50%, 20% and 10% of its full APN serving capacity respectively to APN 1. This is e.g. true if PGW1, PGW2 and PGW3 have a full APN serving capacity of 1 000 000, 800 000 and 500 000 PDN connections respectively and if PGW1, PGW2 and PGW3 have allocated 500 000, 160 000 and 50 000 PDN connections respectively for APN1.

The APN load information indicates the load that each available PGW currently experiences with respect to a particular APN, e.g. APN1, preferably in relation to the capacity allocated to APN1. For example, assume that PGW1, PGW2 and PGW3 experience a load of 60%, 50% and 50% respectively of the APN serving capacity allocated to APN 1. This is e.g. true if PGW1, PGW2 and PGW3 have allocated 500 000, 160 000 and 50 000 PDN connections respectively for APN1 and if PGW1, PGW2 and PGW3 currently serves 300 000, 80 000 and 25 000 PDN connections respectively for APN1. Alternatively, the APN load information may indicate the load that each available PGW currently experiences with respect to APN1 in relation to its full APN serving capacity.

Figure 2:
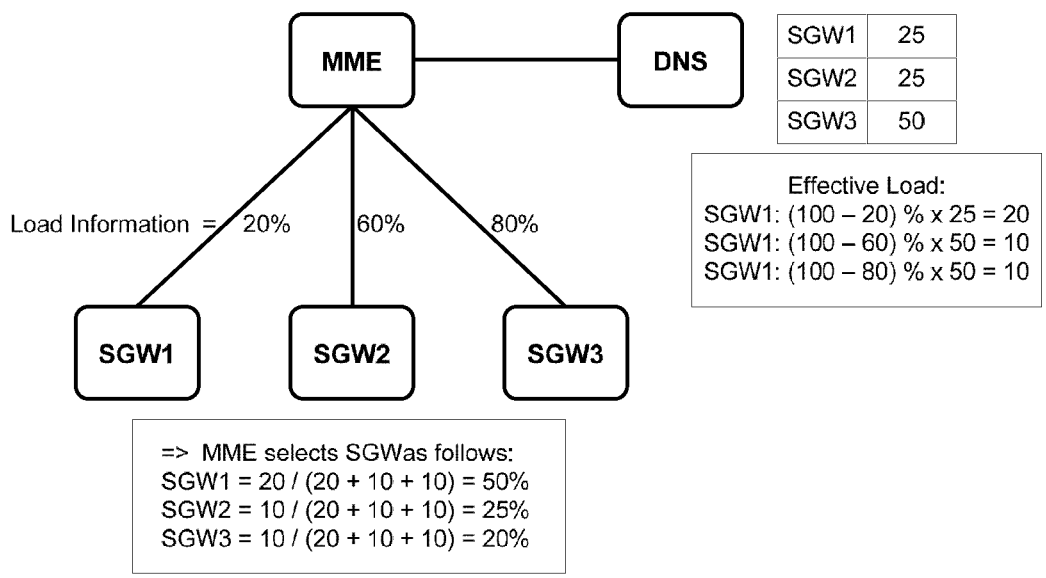
FIG. 2 is a schematic illustration of an exemplifying known selection scheme, however selecting an SGW instead of a PGW.

In addition, the MME receives the access gateway weight factor information, preferably from a Domain Name Server (DNS) or similar as described above with reference to FIG. 2. The exemplifying DNS in FIG. 3 has been denoted DNS1. The weight factor information indicates the relative amount at which each PGW should be selected when a PDN connection is created. For example, assume that PGW1, PGW2 and PGW3 have weight factors 20, 20 and 60 respectively. This implies that out of 10 establishments of PDN connections then PGW1, PGW2 and PGW3 should be selected 2, 2 and 6 times respectively.

The MME then calculates the effective load with respect to APN1 for each PGW such that the APN load information is subtracted from 100% for each PGW and the result is multiplied by the APN capacity factor for APN1 and the weight factor for the PGW in question. For example, assume that PGW1 is associated with an APN1 load of 60%, and an APN1 capacity of 50%, and a weight factor of 20, then the effective load is calculated as (100−60) %×50%×20=4. The same applies mutatis mutandis for PGW2 and PGW3.

The MME then selects the PGWs based on the effective load for each PGW divided by the sum of the effective loads for all available PGWs. For example, assume that the effective load for PGW1, PGW2 and PGW3 is 4, 2 and 3 respectively, then the MME will select PGW1 four (4) times of nine (9) [4/(4+2+3)], and PGW2 two (2) times of nine (9) [2/(4+2+3)], and PGW3 three (3) times of nine (9) [3/(4+2+3)].

The introduction of APN capacity information makes it possible to accomplish a load sharing among the available network access gateway nodes (e.g. the available PGWs) that considers the actual capacity allocated by each available network access gateway node. Moreover, the manner of introducing the APN capacity information as indicated above also makes use of the DNS weight factor information, which offers compatibility with earlier suggestions and also a further possibility of setting the parameters for selecting a suitable network access gateway node.

Figure 4:
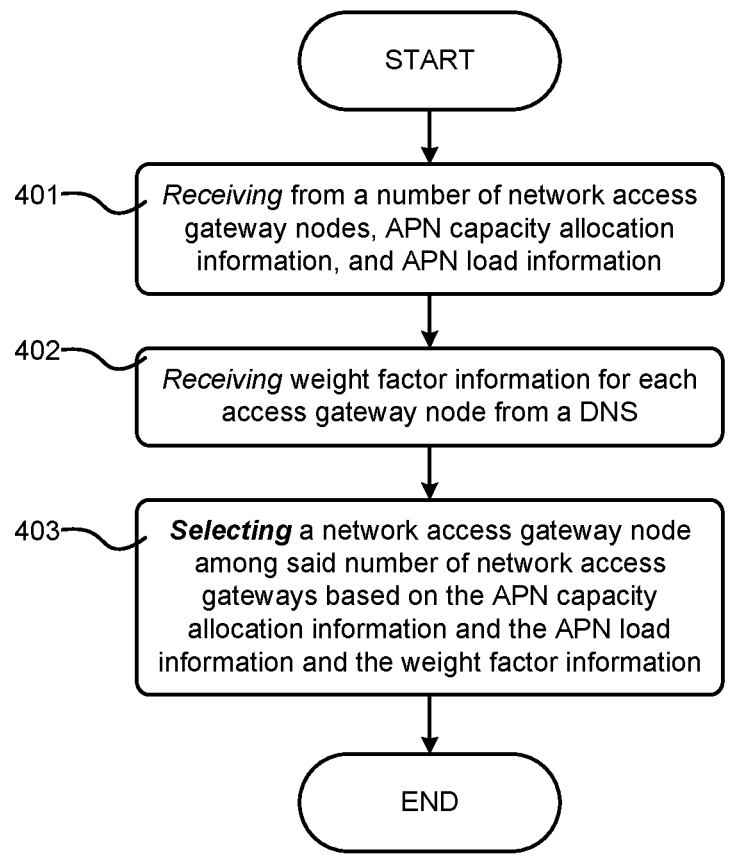
FIG. 4 is a schematic illustration of an exemplifying flowchart showing operations of some exemplifying embodiments in a mobility management node as described herein
Figure 6:
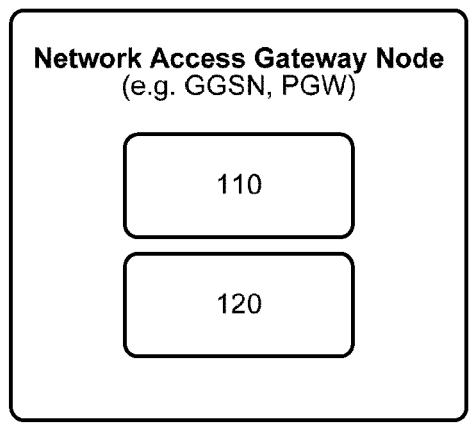
FIG. 6 is a schematic illustration of a network access gateway node according to some embodiments described herein.

FIG. 4 illustrates a flow diagram depicting exemplifying operations which may be taken by a mobility management node (e.g. a MME or an SGSN or similar) when selecting a network access gateway node (e.g. a PGW or a GGSN or similar) when establishing a PDN connection for a radio terminal (e.g. an UE or similar) to a PDN identified by an APN. The exemplifying operations 401, 402, 403 illustrated in FIG. 6 are performed in a mobility management node. The mobility management node is configured to operatively manage the mobility for the radio terminal.

The exemplifying operations 401, 402, 403 illustrated in FIG. 4 will now be discussed in some detail below.

Example Operation 401:

A first exemplifying operation performed in the mobility management node is receiving, from a number of network access gateway nodes, APN capacity allocation information indicating the capacity that each access gateway node has allocated to serve a particular APN, e.g. APN1, and also receiving APN load information indicating the APN load that each access gateway currently experience with respect to the APN in question.

Example Operation 402:

A second exemplifying operation performed in the mobility management node is receiving, from a DNS, weight factor information indicating the relative amount at which each access gateway node should be selected when a PDN connection is created.

Figure 5:
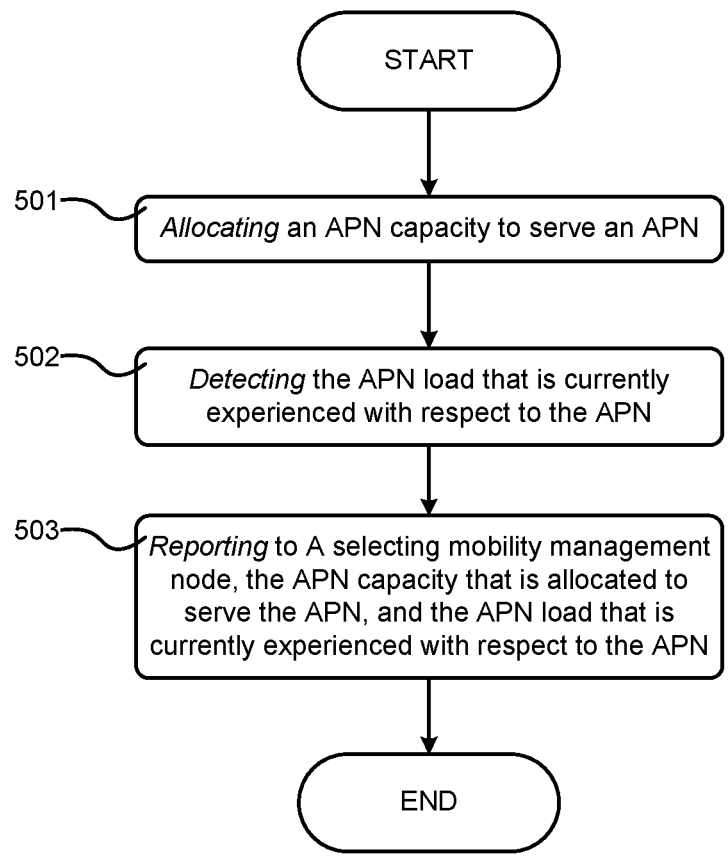
FIG. 5 is a schematic illustration of an exemplifying flowchart showing operations of some exemplifying embodiments in a network access gateway node as described herein

Example Operation 403:

A second exemplifying operation performed in the mobility management node is selecting a network access gateway node among said number of network access gateways based on the APN capacity allocation information and the APN load information and the weight factor information FIG. 5 illustrates a flow diagram depicting exemplifying operations which may be taken by a network access gateway node (e.g. a PGW or GGSN or similar) for enabling a mobility management node (e.g. a MME or a SGSN or similar) to select a network access gateway node among a number of available network access gateway nodes when establishing a PDN, connection for a radio terminal (e.g. an UE or similar) to a PDN identified by an APN The exemplifying operations 501, 502, 503 illustrated in FIG. 5 are performed in a network access gateway node. The network access gateway node is configured to operatively act as a network access gateway to the PDN in question so as to provide connectivity for the radio terminal (UE) to the PDN identified by the APN.

The exemplifying operations 501, 502, 503 illustrated in FIGS. 6-7 will now be discussed in some detail below.

Example Operation 501:

A first exemplifying operation performed in the network access gateway node is allocating an APN capacity (e.g. corresponding to a number o PDN connections) for serving a specific APN, e.g. APN1. The allocation may e.g. be 50% corresponding to an allocation of 500 000 PDN connection for APN1 out of a total of 1000 0000 PDN connections that can be served by the network access gateway node.

Example Operation 502:

A second exemplifying operation performed in the network access gateway node is detecting the APN load that is currently experienced by the network access gateway node with respect to the APN, e.g. APN1. The detecting may e.g. be done by knowing the full capacity of the access gateway node in this respect (could e.g. be preconfigured into the access gateway node) and then count the number of PDN connections currently established with respect to the APN in question, or in any other suitable manner as can be easily understood by a skilled person having the benefit of this disclosure.

Example Operation 503:

A third exemplifying operation performed in the network access gateway node is reporting to the mobility management node, APN capacity allocation information indicating the APN capacity that is allocated to serve the APN1, and APN load information indicating the APN load that is currently experienced with respect to the APN1.

FIG. 6 illustrates an exemplifying network access gateway node configured to operatively perform the operations of the exemplifying embodiments described herein. As shown in FIG. 6, the network gateway node may comprise a processor arrangement 110 and a memory arrangement 120. The processor arrangement is preferably configured to operatively communicate with other nodes such as other access gateway nodes and mobility management nodes and to operatively execute instructions stored in the memory arrangement. The memory arrangement comprises instructions executable by said processor arrangement such that the exemplifying network access gateway node is configured to perform the operations of the exemplifying embodiments described herein. The processor arrangement 110 may comprise any suitable digital and/or analogue circuitry that enables it to execute the instructions stored in the memory arrangement so as to perform the operations and functions of the exemplifying embodiments described herein. The digital and/or analogue circuitry of the processor arrangement 110 and the memory arrangement 120 may e.g. be the same or similar as those in known network access gateway nodes such as a GGSN or a PGW or similar, whereas the instructions are specific for the embodiments described herein.

Figure 7:
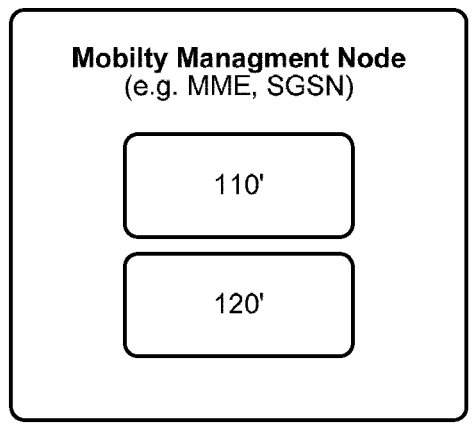
FIG. 7 is a schematic illustration of a mobility management node according to some embodiments described herein.

FIG. 7 illustrates an exemplifying mobility management node configured to operatively perform the operations of the exemplifying embodiments described herein. As shown in FIG. 7, the network gateway node may comprise a processor arrangement 110' and a memory arrangement 120'. The processor arrangement is preferably configured to operatively communicate with other nodes such as network access gateway nodes and other mobility management nodes and to operatively execute instructions stored in the memory arrangement. The memory arrangement comprises instructions executable by said processor arrangement such that the exemplifying mobility management node is configured to perform the operations of the exemplifying embodiments described herein. The processor arrangement 110' may comprise any suitable digital and/or analogue circuitry that enables it to execute the instructions stored in the memory arrangement so as to perform the operations and functions of the exemplifying embodiments described herein. The digital and/or analogue circuitry of the processor arrangement 110' and the memory arrangement 120' may e.g. be the same or similar as those in known mobility management nodes such as a MME or a SGSN or similar, whereas the instructions are specific for the embodiments described herein.

The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The invention claimed is:

1. A method in a mobility management node for selecting a network access gateway node when establishing a Packet Data Network (PDN) connection for a radio terminal to a PDN identified by an Access Point Name (APN), which mobility management node is configured to operatively manage the mobility for the radio terminal and which access gateway node is configured to operatively act as a network access gateway to the PDN so as to provide connectivity for the radio terminal to the PDN, the method comprises:

receiving, from each network access gateway node included in a group of network access gateway nodes, APN capacity allocation information indicating the APN capacity that the network access gateway node has allocated to serve the APN and APN load information indicating the APN load that the network access gateway node currently experiences with respect to the APN, receiving, from a Domain Name Server weight factor information indicating the relative amount at which each network access gateway node included in said group of network access gateway nodes should be selected when a PDN connection is created, and selecting a network access gateway node from said group of network access gateway nodes based on the APN capacity allocation information, the APN load information, and the weight factor information.

2. The method according to claim 1, wherein the selecting comprises:

calculating an effective load for each network access gateway node included in said group of network access gateway nodes with respect to said APN based on the APN load, the APN capacity and the weight factor information for each said network access gateway node, and then selecting the network access gateway node from said group of network access gateway nodes based on the effective load for each said network access gateway divided by the sum of the effective loads for all available network access gateways.

3. The method according to claim 1, wherein the selecting comprises:
calculating an effective load for each network access gateway node included in said group of network access gateway nodes with respect to said APN such that the APN load is subtracted from 100% for each network access gateway and the result is multiplied by the APN capacity for the APN and the weight factor information for the network access gateway node, and then
selecting the network access gateway node from said group of network access gateway nodes based on the effective load for each network access gateway divided by the sum of the effective loads for all available network access gateways.

4. A mobility management node configured to operatively select a network access gateway node when establishing a Packet Data Network (PDN) connection for a radio terminal to a PDN identified by an Access Point Name (APN), which mobility management node is configured to operatively manage the mobility for the radio terminal and which network access gateway node is configured to operatively act as a network access gateway to the PDN so as to provide connectivity for the radio terminal to the PDN, wherein the mobility management node comprises a memory arrangement and a processor arrangement configured to:
for each network access gateway node included in a group of network access gateway nodes, obtain APN capacity allocation information indicating the APN capacity that the network access gateway node has allocated to serve the APN and APN load information indicating the APN load that the network access gateway node currently experiences with respect to the APN,
obtain weight factor information indicating the relative amount at which each said access gateway node should be selected when a PDN connection is created, wherein the weight factor information is provided by a Domain Name Server, and
select a network access gateway node from said group of network access gateway nodes based on the APN capacity allocation information, the APN load information, and the weight factor information.

5. The mobility management node according to claim 4, wherein the processor arrangement is further configured to:
calculate an effective load for each said network access gateway node with respect to said APN based on the APN load, the APN capacity, and the weight factor information for the network access gateway node, and then
select the network access gateway node from said group of network access gateways based on the effective load for each network access gateway divided by the sum of the effective loads for all available network access gateways.

6. The mobility management node according to claim 4, wherein the processor arrangement is further configured to:
calculate an effective load for each network access gateway node with respect to said APN such that the APN load is subtracted from 100% for each network access gateway and the result is multiplied by the APN capacity for the APN and the weight factor information for the network access gateway node; and then
select the network access gateway node among said group of network access gateway nodes based on the effective load for each network access gateway divided by the sum of the effective loads for all available network access gateways.

7. A method in a network access gateway node for providing information to a mobility management node, which information is used by the mobility management node in selecting a network access gateway node from a group of network access gateway nodes when establishing a Packet Data Network (PND) connection for a radio terminal to a PDN identified by an Access Point Name (APN), the method comprising:
determining an APN load metric for the APN, wherein the APN load metric indicates a current resource utilization for the APN, as a percentage, compared to the total resources reserved for the APN; and
reporting to the mobility management node i) APN capacity allocation information indicating, as a percentage, the total resources reserved for the APN compared to the total resources of the network access gateway, and ii) the APN load metric indicating the current resource utilization for the APN, as a percentage, compared to the total resources reserved for the APN.

8. A network access gateway node configured to provide information to a mobility management node, which information can be used by the mobility management node in selecting a network access gateway node from a group of network access gateway nodes when establishing a Packet Data Network (PND) connection for a radio terminal to a PDN identified by an Access Point Name (APN), the network access gateway node comprising a memory arrangement and a processor arrangement configured to:
determine an APN load metric for the APN, wherein the APN load metric indicates a current resource utilization for the APN, as a percentage, compared to the total resources reserved for the APN; and
reporting to the mobility management node i) APN capacity allocation information indicating, as a percentage, the total resources reserved for the APN compared to the total resources of the network access gateway, and ii) the APN load metric indicating the current resource utilization for the APN, as a percentage, compared to the total resources reserved for the APN.

* * * * *

UNITED STATES PATENT AND TRADEMARK OFFICE
CERTIFICATE OF CORRECTION

PATENT NO. : 10,939,324 B2
APPLICATION NO. : 15/958816
DATED : March 2, 2021
INVENTOR(S) : Yang et al.

It is certified that error appears in the above-identified patent and that said Letters Patent is hereby corrected as shown below:

On the Title Page

On Page 2, in Item (56), under "OTHER PUBLICATIONS", in Column 2, Line 33, delete "201480061574.8." and insert -- 201480061574.8 --, therefor.

In the Drawings

In Fig. 3, Sheet 2 of 5, and on the title page, the print figure, under "MME1", in Line 2, delete "Mangament" and insert -- Management --, therefor.

In the Specification

In Column 1, Line 9, delete "2014" and insert -- 2014, now U.S. Pat. No. 10,015,697 --, therefor.

In Column 2, Lines 64-65, delete "number available" and insert -- number of available --, therefor.

In Column 8, Line 28, delete "51-U," and insert -- S1-U, --, therefor.

In Column 12, Line 66, delete "o" and insert -- of --, therefor.

In the Claims

In Column 16, Line 20, in Claim 7, delete "(PND)" and insert -- (PDN) --, therefor.

In Column 16, Line 39, in Claim 8, delete "(PND)" and insert -- (PDN) --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*